Patented May 11, 1954

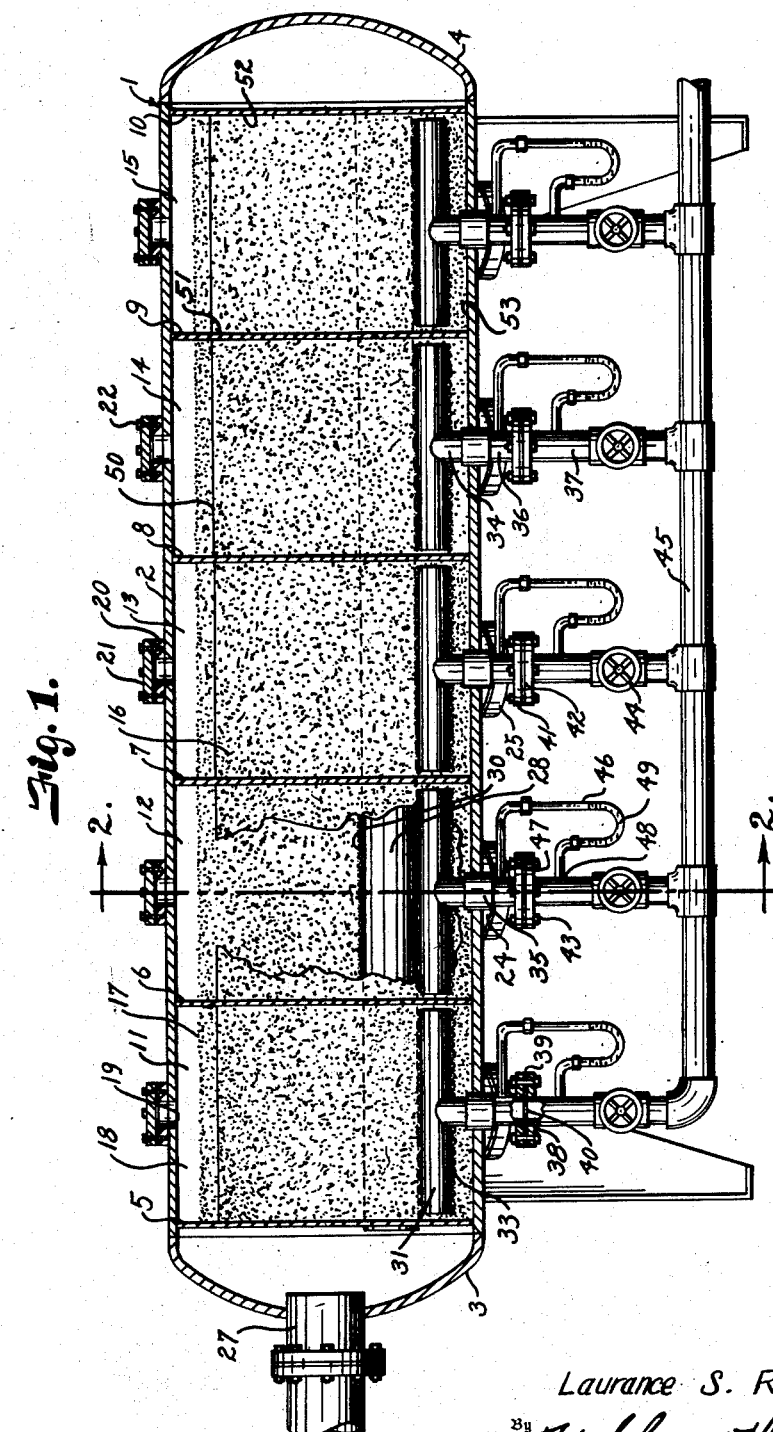

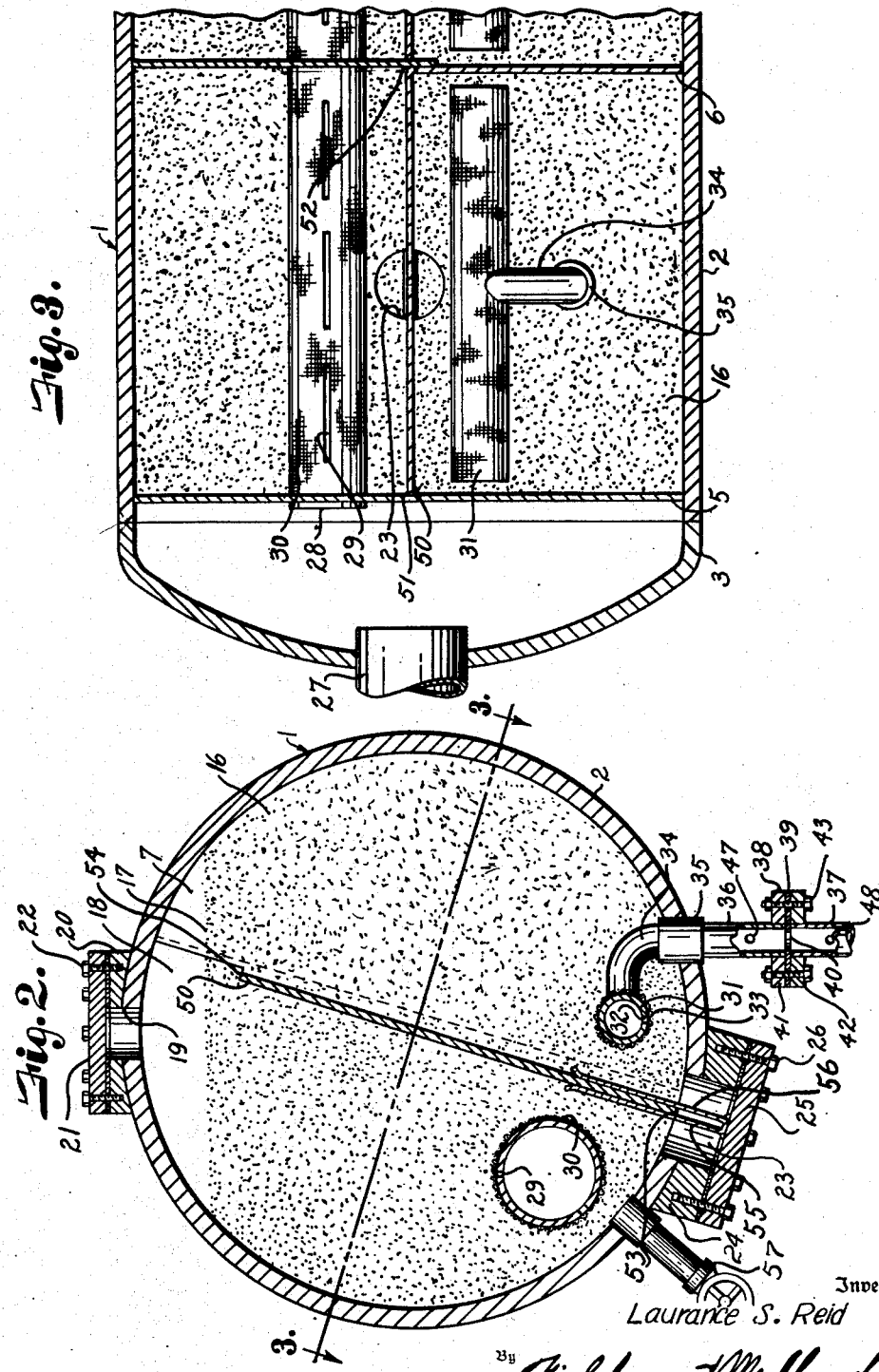

2,678,108

UNITED STATES PATENT OFFICE 2,678,108

APPARATUS FOR FLOWING GAS THROUGH A PERMEABLE ADSORBENT BED

Laurance S. Reid, Norman, Okla.

Application September 3, 1949, Serial No. 114,045

3 Claims. (Cl. 183—4.0)

This invention relates to apparatus for adsorbing components from a fluid mixture by means of a permeable bed of solid sorbent.

Prior to the present invention the conventional method for the dynamic adsorption of one or more components from a fluid mixture was to flow the fluid mixture in a linear direction through a solid sorbent backed in a vertically arranged vessel, the sorbent being supported between permeable screens interposed within the ends of the vessel to permit unobstructed flow into and away from the sorbent bed. However, such apparatus is severely restricted by performance limitations. Consequently, large and costly equipment is required to process fluid mixtures in large volumes.

Another difficulty is that in treatment of large volumes of fluids ratio of the height to diameter of the sorbent bed ranges from 6:1 to 10:1 ratios. Consequently, the pressure drop through the bed is large and costly when measured in terms of compressor horsepower.

Further difficulties are that when the flow moves downward through such beds they become compacted to further increase flow pressure losses, and when the flow is upwardly the sorbent is subjected to disintegration by the lifting and spinning of the granules. The impact velocity of the fluid mixture is often high enough to pulverize the sorbent.

Further difficulties are encountered in reactivation of the sorbent beds which is usually accomplished by passing hot gases through the sorbent. Considerable time is required to bring the bed up to the proper temperature level because the gas entering the bed gives up its heat to the sorbent first encountered and is cooled thereby, and the heat front advances slowly from the inlet to the outlet end of the bed. Also where the mass of sorbent is great and the vessel is large it is obvious that much time is required to accomplish reactivation and additional large sorbers must be used to permit the process to operate continuously while one vessel is being reactivated. In the process of reactivation the adsorbed components are driven off or desorbed from the sorbent at a certain high temperature and are swept by the gas stream into cooler portions of the sorbent bed where they are condensed in quantities greater than the sorptive capacity of the sorbent which they contact. Therefore, the sorbent may be damaged by excessive quantities of liquid deposited in this manner, or solidified where the sorbent has been pulverized. Another disadvantage is that the large external surface presented by large sorbers accentuates the loss of heat by radiation and convection to atmosphere placing greater demand on the process heating facilities, or requiring additional time for reactivation, or both.

Therefore, the principal objects of the invention are to provide a more efficient apparatus for sorbing a component from a fluid mixture at a lower pressure differential by effecting transverse flow of the fluid mixture as distinguished from vertical flow; to effect sorption by dividing the flow of the fluid mixture and directing each flow through an individual relatively shallow sorbent bed and thereafter recombining the streams into a single main stream; to maintain flow through the respective beds in a uniform manner and at a moderate velocity for avoiding disintegration of the sorbent material and yet increasing the allowable velocity per group of beds comprising a single sorber; and to provide a simple and inexpensive apparatus which may be fabricated and installed at substantially less cost.

Further objects of the invention are to increase efficiency of reactivation by shortening the time and decreasing the amount of heat required through removal of the desorbed components from the sorbent quickly and effectively and thereby minimize condensation of vapors on cooler portions of the sorbent material; and to provide for shortening the sorption and desorption cycles to the point where maximum recovery of two or more desirable components may be effected, particularly in those cases where one component is preferentially sorbed and will in time desorb and replace the other desirable sorbed component. Another object of the invention is to provide a free gas space on top of the sorbent beds which is an intermediate point in the flow to effect redistribution and thorough mixing of the fluid mixture after partial sorption, and thereby reducing the effect of any channeling which may occur in passing from the inlet to the free space or from the free space to the gas outlet.

In accomplishing these and other objects of the invention I have provided improved structure, the preferred form of which is illustrated in the accompanying drawing wherein:

Fig. 1 is a longitudinal section through a sorbing apparatus embodying the features of the present invention and which is utilized for practicing my improved method of removing one or more components from a fluid mixture.

Fig. 2 is an enlarged cross section through the adsorber on the line 2—2 of Fig. 1.

Fig. 3 is an enlarged horizontal section on line 3—3 of Fig. 2.

Referring more in detail to the drawings:

1 designates an elongated horizontally disposed vessel having an annular cylindrical wall 2 closed at the ends by heads 3 and 4 which are preferably convex shape. Extending transversely within the vessel are a plurality of spaced partitions 5 to 10 inclusive with the end partitions 5 and 10 spaced from the heads 3 and 4. The intermediate partitions are spaced apart to form a plurality of cells 11, 12, 13, 14 and 15. The partitions are secured about their periphery to the inner surface of the shell to form pressure tight joints so that the cells are individual with respect to each other except for the inlet and outlet connections whereby a fluid mixture under pressure is passed through the cells to effect removal of one or more of the components of the mixture as later described. Each cell contains a bed or sorbent material 16 that is supported therein on the lower portion of the cylindrical wall and which has an upper surface 17 spaced below the top portion of the cylindrical wall to form a pressure equalizing and distributing space 18 in the upper portion of the respective cells. The material forming the sorbent beds is inserted through openings 19 in the top portion of the cylindrical wall, each opening being encircled by a flange 20 to which a cover plate 21 is removably attached by fastening devices such as stud bolts 22.

Similarly formed in the opposite or bottom wall portion of the vessel in registry with each cell is an opening 23 through which spent sorbent is removed when the material is no longer effective and must be replaced. The openings 23 are similarly encircled by flanges 24 to which are attached closure plates 25 that are secured by fastening devices such as stud bolts 26. The sorbent material may be of any suitable type which has an affinity for the desired components of the mixture to the exclusion of the other components and which is readily reactivated to remove the adsorbed components when the beds approach saturation.

The fluid mixture to be treated is admitted to the vessel at one end thereof, for example, the end closed by the head 3, through a pipe 27 and to the bottom of the respective cells through a common distributing pipe 28 that extends through suitable openings in the respective partitions and which is welded therein to form leak-tight joints. The distributing pipe is preferably located at one side of the lower openings 23 so as not to interfere with the removal of the adsorbent. The portions of the duct extending through the respective cells are provided with one or more slot-like openings 29 through which the fluid mixture is divided into separate streams and admitted into the respective cells. In order to prevent passage of the sorbent material through the slot-like openings 29 the portions of the duct containing the openings are encircled by screens 30.

Since it is the purpose of the present invention to provide for low pressure differentials between the inlet and outlet of the sorbent beds, the sorbent beds are relatively shallow and to assure desired contact of the fluid mixture with the sorbent, the fluid mixture is caused to flow through the beds in a circuitous path. Therefore, the fluid is removed from the bottom portions of each cell by way of collecting headers 31 located on the opposite side of the partitions 50 from the openings 23, the headers being provided with downwardly facing slot-like inlet openings 32 similar to the slot-like openings of the distributing duct and the openings are covered with a screen 33 as shown in Fig. 2. Connected with each collecting header substantially intermediate the ends thereof is a discharge duct 34 which ducts extend downwardly through couplings 35 secured within the wall of the vessel and which are connected with nipples 36 that in turn connect with discharge branches 37 through metering devices 38 comprising plates 39 having orifices 40 of predetermined size. The orifice plates are retained in position between flanges 41 and 42 that are provided on the nipples 36 and inlet ends of the branches 37 and which are secured in clamping relation with the orifice plates by fastening devices such as bolts 43. Connected in each branch 37 is a control valve 44 for regulating the flow to a manifold 45 that interconnects the respective branches and in which the separate streams of fluid are united for transportation to a pipe line leading to a distant market or other point of use for the fluid. In order to gauge the respective flows through the discharge branches each branch is provided with a manometer 46, having inlets 47 and 48 by which pressures on the respective sides of the orifice plates act upon a fluid such as mercury contained within U tubes 49. To assure upward flow through each bed to the space 18 and downward flow from the space to the respective outlet connections, each cell is divided by a partition 50 having its side edges 51 and 52 welded to the adjacent transverse partitions and its lower edge 53 welded to the inner surface of the lower portion of the vessel wall at a point extending across the discharge openings 23 as best shown in Fig. 2. The upper edge 54 of the partitions 50 terminate short of the top of the cells and preferably below the level of the beds. It is obvious that the partitions 50 assure circuitous flow of the fluid mixture from the inlet to the outlet. To prevent short circuiting of the fluid flow through the discharge openings 23 each closure plate 25 is provided with spaced plate members 55 and 56 of sufficient width to extend across the discharge openings and closely engage the respective sides of the longitudinal partitions as shown in Fig. 2. It is obvious that an alternate construction may consist of separate openings in the lower portion of the shell 2 on opposite sides of the longitudinal plates 50. Each cell may be provided with a drain 57 for discharging any liquid that might accumulate in the bottom of the cells.

In operation, the fluid mixture is admitted through the inlet pipe 27 into the space between the head 3 and first partition 5 for flow into the open end of the distributing duct 28 where the fluid flows therethrough for distribution into the respective cells by way of the slot-like openings 29 therein, the flows being upwardly through the respective beds 16 at one side of the longitudinal partitions 50 where the fluid contacts the surfaces of the sorbent material and the desirable components or those for which the sorbent has affinity, are sorbed thereby and the remainder of the flow is discharged into the space 18 where the pressure is equalized and flow is continued across the top of the partition and down through the opposite side of the bed in sorbing contact, to the inlets 32 in the collecting headers 31 from where the fluid flows through the orifices 39 to be recombined in the discharge manifold. Due to various reasons such as variation in permeability of the beds, sorbent content, mechanical variations and length of the various flows, the quantity of fluid passing through each cell may not be uniform. Therefore, the valves 44 will be adjusted until the reading of the manometers 46 indicate equal flows through the respective orifices 40. The flows continue through the respective cells giving up the desirable components to the sorbent beds until it becomes necessary to start the reactivation cycle.

The flow of fluid mixture is then diverted from the inlet pipe 27 and a heated desorbing medium such as gas is admitted therein for flow through the respective beds. Therefore, two units of the type described are usually employed so that when one is operating on the reactivation cycle the fluid mixture is diverted to the other unit for maintaining the sorption cycle for carrying on a continuous process. The relatively small size of the beds 16 and the separate flows of heating medium soon bring the beds up to the temperature levels. The size of the beds and flow path of the hot gases together with heat conduction through the partitions bring about substantially uniform desorbing temperature so that the adsorbed components are quickly released and swept away with the gas streams. The rapid establishment of uniform temperatures reduces possibility of condensation in any part of the beds greater than the sorption capacity of the material. Consequently, the beds do not become damaged by excessive quantities of liquid that are ordinarily deposited when uniform desorbing temperatures are not maintained. It is obvious that the exterior surfaces of the vessel exposed to the external atmosphere are relatively small, and when properly insulated, the heat losses through radiation and convection to atmosphere are reduced to a minimum with less load upon the heating equipment (not shown). After desorption the flow of heating medium is suspended, the sorbent bed is cooled, and flow of the fluid mixture is reestablished as above described.

In describing the invention I have defined the medium to be treated by the general term "fluid mixture" to include both liquids and gases, the controlling factor being the selection of an adsorbent having characteristics to adsorb one or more components to the exclusion of the other components.

The shorter sorption and desorption cycles allow recovery or removal of two or more desirable components particularly where one component is preferentially adsorbed and will in time desorb and replace the other desirable component, the reactivation cycle being started and completed before the second desirable component begins to be replaced in the cooperating unit. Should the sorbent become spent, it is readily removed through the openings 23 and the cells refilled with new material through the upper openings 19. It will be noted that the areas throughout the height of the cell spaces vary from a maximum at the horizontal axis of the vessel to a minimum at the upper and lower portions of the bed. Thus when fluid is discharged into a cell space at a constant rate, the mass velocity of the fluid varies continuously as a fluid passes vertically upward on one side of a longitudinal partition and similarly when it passes downward on the other side or vice versa.

This feature provides the necessary element for increasing the retention time of the fluid in the desiccant bed by means of a very simple and relatively inexpensive apparatus.

The structure also results in localizing any excessive velocities at the inlet and outlet ends of the sorbent bed particularly in the event that the sorber may be overloaded. The variable mass velocity also substantially eliminates the problems of channeling.

From the foregoing it is obvious that I have provided an efficient apparatus for sorbing a component from a fluid mixture at a low pressure differential by effecting circuitous flow of divided streams through relatively shallow sorbent beds and that the beds are more quickly and efficiently reactivated when heat is applied.

What I claim and desire to secure by Letters Patent is:

1. An apparatus for sorbing vapor components from a gas stream while under flow comprising, a substantially horizontally disposed cylindrical vessel having substantially parallel flat end walls, partition means extending longitudinally of said vessel sealed to the cylindrical wall of said vessel along one edge of said partition means and also sealed to said end walls to provide a plurality of compartments, said partition means being formed to provide passage means between said compartments adjacent the cylindrical wall of said vessel and substantially opposite said sealed edge, said passage means forming a gas outlet for one of said compartments and a gas inlet for another of said compartments, granular sorbing material substantially filling said one and said other compartments to form cylindrical plano-convex sorbtion beds, gas inlet means for said one compartment located at substantially the opposite side of said one compartment from said passage means, and gas outlet means for said other compartment located at substantially the opposite side of said other compartment from said passage means, whereby the velocity of gas flow through said beds of sorbent material in said one and said other compartments is reduced at the center portions of said one and said other compartments to increase the retention time of said gas sorbing material, and high velocity gas flow is localized at the inlets and outlets of said one and said other compartments.

2. An apparatus for sorbing vapor components from a gas stream while under flow comprising, a substantially horizontally disposed cylindrical vessel having a plurality of substantially parallel flat transverse walls sealed to the cylindrical wall of said vessel to define a plurality of separate cells, partition means extending longitudinally of said vessel sealed to said cylindrical wall along one edge of said partition means and also sealed to each of said cell defining walls to provide a plurality of compartments in each of said cells, said partition means being formed to provide passage means between said compartments in each of said cells adjacent said cylindrical wall and substantially opposite said sealed edge, each of said passage means forming a gas outlet for one of said compartments and a gas inlet for another of said compartments, granular sorbing material substantially filling said compartments to provide each of said cells with at least two cylindrical plano-convex beds of sorbing material, gas inlet means for each of said cells located at substantially the opposite side of said one compartment from said passage means, and gas outlet means for each of said cells located at substantially the opposite side of said other compartment from said passage means, whereby the velocity of gas flow through said beds of sorbent material in said cells is reduced at the center portions of said beds to increase the retention time of said gas sorbing material and high velocity gas flow through said plurality of cells is localized at the inlets and outlets of said beds.

3. An apparatus for sorbing vapor components from a gas stream while under flow comprising, a substantially horizontally disposed cylindrical vessel having a plurality of substantially parallel flat transverse walls sealed to the cylindrical wall of said vessel to define a plurality of separate cells, partition means extending longitudinally of said vessel sealed to said cylindrical wall along the bottom edge of said partition means and also sealed to each of said cell defining walls to provide a plurality of compartments in each of said cells, said partition means being formed to provide passage means between said compartments in each of said cells adjacent to the top of said partition means, each of said passage means forming a gas outlet for one of said compartments and a gas inlet for another of said compartments, granular sorbing material filling said compartments substantially to the level of said passage means to form truncated cylindrical plano-convex beds of sorbing material surmounted by pressure equalizing chambers communicating with said passage means, gas inlet means for each of said cells located adjacent the bottom of said one compartment, and gas outlet means for each of said cells located adjacent the bottom of said other compartment, whereby the velocity of gas flow through said sorbent material in said cells is reduced at the center portions of said beds to increase the retention time of said gas sorbing material and high velocity gas flow through said plurality of cells is localized at the inlets and outlets of said beds.

References Cited in the file of this patent

UNITED STATES PATENTS

| Number | Name | Date |
| --- | --- | --- |
| 270,881 | Aborn | Jan. 23, 1883 |
| 558,485 | Davis | Apr. 21, 1896 |
| 621,803 | Felts | Mar. 28, 1899 |
| 1,136,608 | Rankin | Jan. 13, 1916 |
| 1,326,374 | Rossiter | Dec. 30, 1919 |
| 1,763,784 | Hodkinson | June 17, 1930 |
| 1,870,321 | Adelson | Aug. 9, 1932 |
| 2,127,561 | Herrmann | Aug. 23, 1938 |
| 2,337,419 | Sensel | Dec. 21, 1943 |
| 2,339,882 | Savage | Jan. 25, 1944 |
| 2,378,651 | Matuszak | June 19, 1945 |

FOREIGN PATENTS

| Number | Country | Date |
| --- | --- | --- |
| 2,574 | Great Britain | of 1913 |